United States Patent [19]

Palmer et al.

[11] 4,358,693

[45] Nov. 9, 1982

[54] PERMANENT MAGNET MOTOR

[75] Inventors: Denis L. Palmer, Multnomah County, Oreg.; Robert A. Palmer, Jr.; Robert A. Palmer, Sr., both of Kitsap County, Wash.

[73] Assignees: Charles L. Palmer; Douglas L. Palmer; Stanley B. Palmer; Lynn L. Staker; Keith W. Cline, all of Portland, Oreg.

[21] Appl. No.: 273,921

[22] Filed: Jun. 15, 1981

[51] Int. Cl.³ .......................................... H02K 37/00
[52] U.S. Cl. ..................................... 310/46; 310/112; 310/268
[58] Field of Search ................ 310/46, 268, 112, 114, 310/126

[56] References Cited

U.S. PATENT DOCUMENTS

| 1,863,294 | 6/1932 | Bogia | 310/46 |
| 3,331,973 | 7/1967 | McClure | 310/46 |
| 3,832,581 | 8/1974 | Hoffman et al. | 310/268 X |

Primary Examiner—Donovan F. Duggan
Attorney, Agent, or Firm—Seed, Berry, Vernon & Baynham

[57] ABSTRACT

A magnetic motor has K stators (K=any integer) and preferably K+1 rotors with each stator having 4n electromagnetic coils (n=any integer), and each coacting rotor has p=3/2n permanent magnets with their poles alternating in polarity. The coils on each stator are arranged in two sets, and a distributor cycles current to the sets so that each set reverses polarity each successive time it is charged.

8 Claims, 13 Drawing Figures

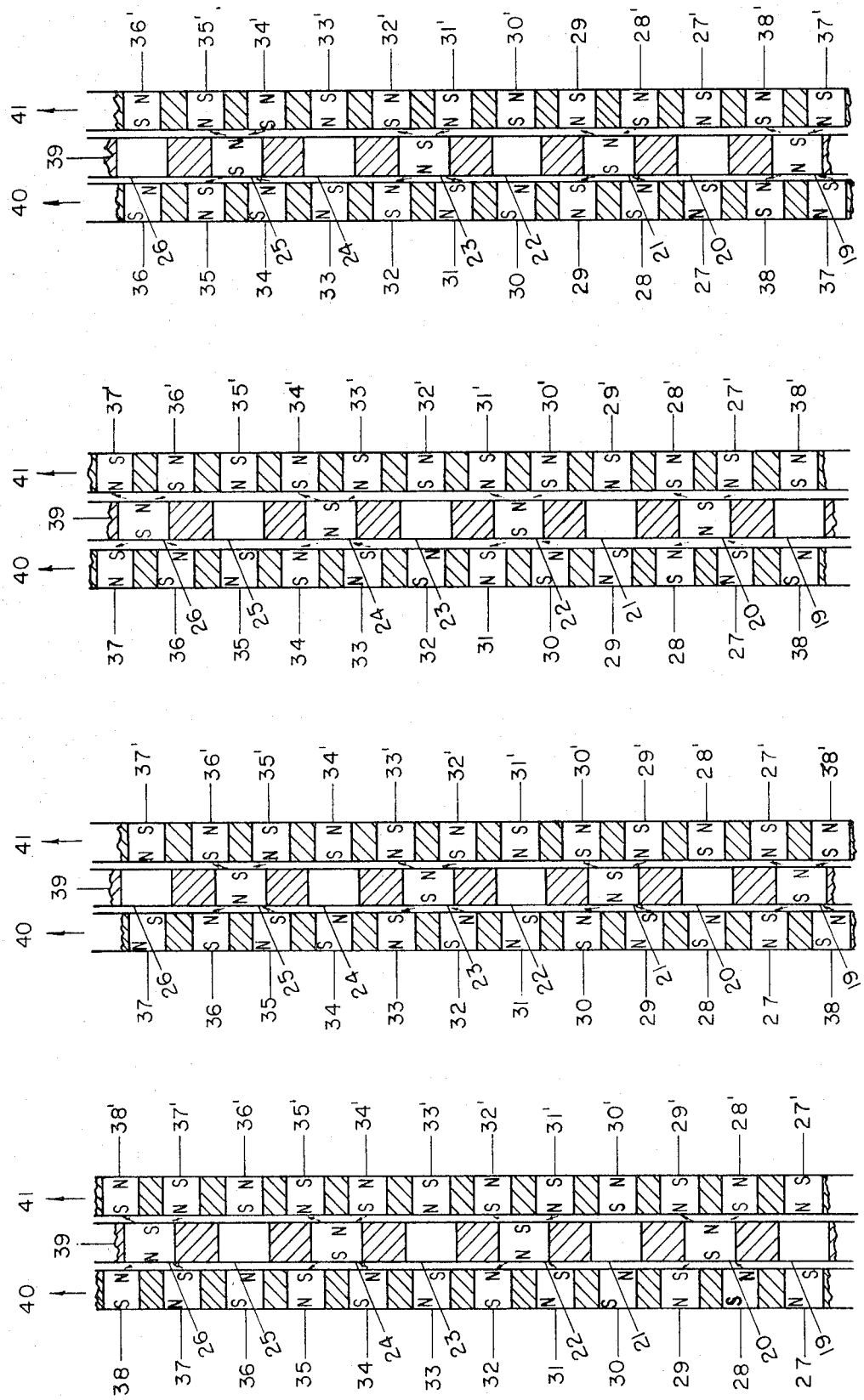

PERMANENT MAGNET MOTOR

DESCRIPTION

1. Technical Field

This invention pertains to direct current electric motors using permanent magnets to supply a large portion of the driving force.

2. Background

Among the most pertinent prior art are the gated magnetic motor described in U.S. Pat. No. 3,670,189 by Monroe and the magnetic motors described in U.S. Pat. No. 3,686,521 by Henry-Baudot. The latter describes a motor using both permanent and electromagnets and maintaining 2p permanent field poles (p=an integer greater than 1) and 2n electromagnetic armature poles (n greater than p but not a multiple of p), and the Monroe patent demonstrates the increase of force between two permanent magnets separated by an electromagnet. Other prior art motors use axially opposed armatures and fields, brushless commutation, both the repulsion and attraction forces of permanent magnets, and nonmagnetic carrier parts.

DISCLOSURE OF INVENTION

The invention is an improvement in magnetic motors using electromagnets in conjunction with permanent magnets. An important object of the invention is to continuously limit all magnetic air-gaps to as short a distance as practicable, preferably less than one-tenth of an inch. Another important object of the invention is to use both poles of each electromagnet to provide driving forces. Other objects of the invention are to provide starting torque from any stopped location, to use both the repulsion and attraction forces of the magnets, to provide the flexibility of being susceptible to power increases by axially adding more rotors and stators, to provide for brushless operation and to provide a majority of the driving force from permanent magnets.

These objectives are met by a motor having k stators (k=any integer) and preferably k+1 rotors, each stator having 4n axially aligned electromagnetic coils (n=any integer) and each rotor having p=(3/2)n axially aligned permanent magnets with the poles alternately aligned around each rotor but identically aligned from rotor to rotor. The radii of the axes of the rotor magnets and stator coils from the centrally located drive shaft are identical.

With this configuration and proper current distribution to the stator coils, starting torque is available for any rotor position; air-gap can approach zero; both repulsion and attraction forces can be used; both poles of each active electromagnet are used; magnetic reluctance can be kept low by minimizing material in the coil cores; and the available magnetic force of the permanent magnets is multiplied by shunting their force fields through the electromagnets.

BRIEF DESCRIPTION OF THE DRAWINGS

FIG. 6 is a linear projection of a circumference through two rotors and a stator of the motor of FIGS. 3–5;

FIG. 7 is the view of FIG. 6 after 15° of rotor rotation;

FIG. 8 is the view of FIG. 6 after 30° of rotor rotation;

FIG. 9 is the view of FIG. 6 after 45° of rotor rotation.

BEST MODE FOR CARRYING OUT THE INVENTION

Figure 1:
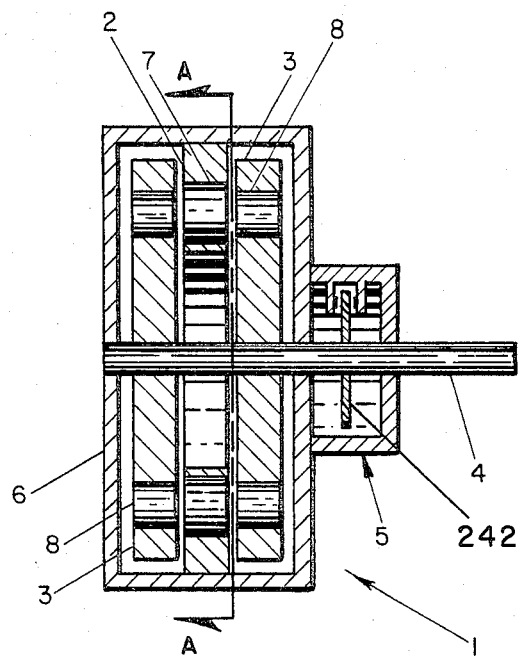
FIG. 1 is an axial section through a simple embodiment of a motor according to the invention.
Figure 3:
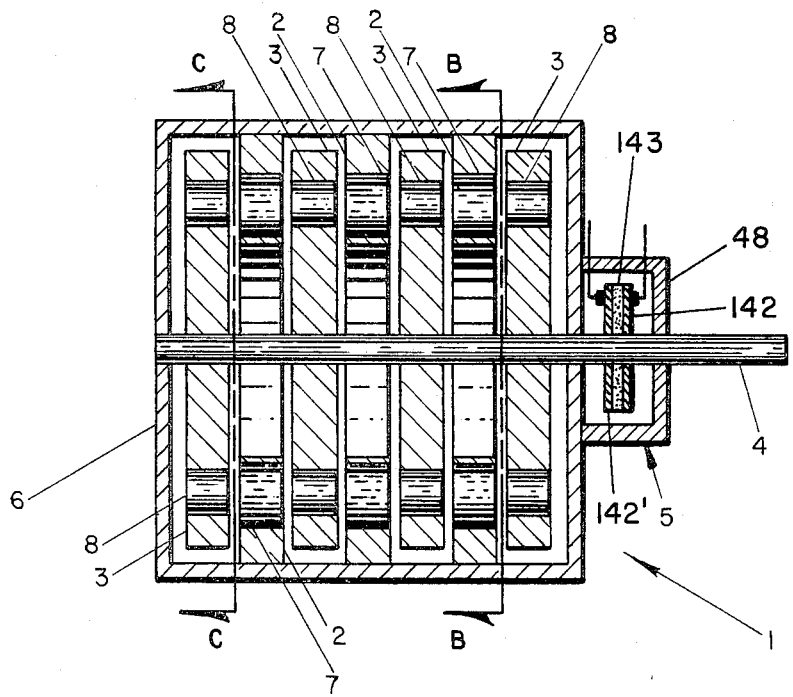
FIG. 3 is an axial section through a more complex embodiment of a motor according to the invention.

Referring to the drawings, FIGS. 1 and 3, the invention embodies a magnetic motor 1 containing stator 2, rotors 3, a central shaft 4, a distributor means 5 and a housing 6. Said stators 2, rotors 3 and housing 6 are made of nonmagnetic material.

Each stator 2 has a plurality of solenoid coils 7 disposed with equal radial spacing around a circumference near the outside circumference of said stators 2. The number of said solenoid coils 7 in each stator 2 is always an integral multiple of four. The cylindrical axis of each said solenoid coil 7 is parallel to the axis of the central shaft 4. The solenoid coils 7 are wound on cores with low magnetic reluctance.

Each rotor 3 has a plurality of permanent magnets 8 disposed at equal radial spacing around the same circumference at which said solenoid coils 7 are disposed. The number of permanent magnets 8 in each rotor 3 is always one and one-half times the number of solenoid coils 7 in each stator 2. The magnetic poles of each permanent magnet 8 are axially aligned with said central shaft 4.

Figure 2:
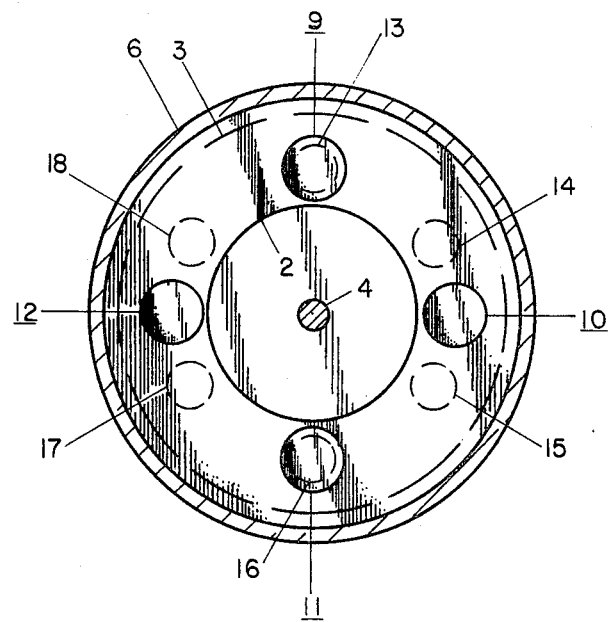
FIG. 2 is a Section A—A from FIG. 1 showing the stator.

Referring now to FIG. 2, the relative locations of the stator coils 9 through 12 and the rotor magnets 13 through 18 are such that at least two-thirds of said rotor magnets 13 through 18 are always misaligned relative to at least half of said stator coils 9 through 12. Thus, with proper current distribution to said stator coils 9 through 12, rotational magnetic forces can be imposed on the rotors 3. The details of operation will be explained presently. However, it should be noted that with only four stator coils and six rotor magnets, the radial gap between said coils and said magnets will often be quite large.

Figure 4:
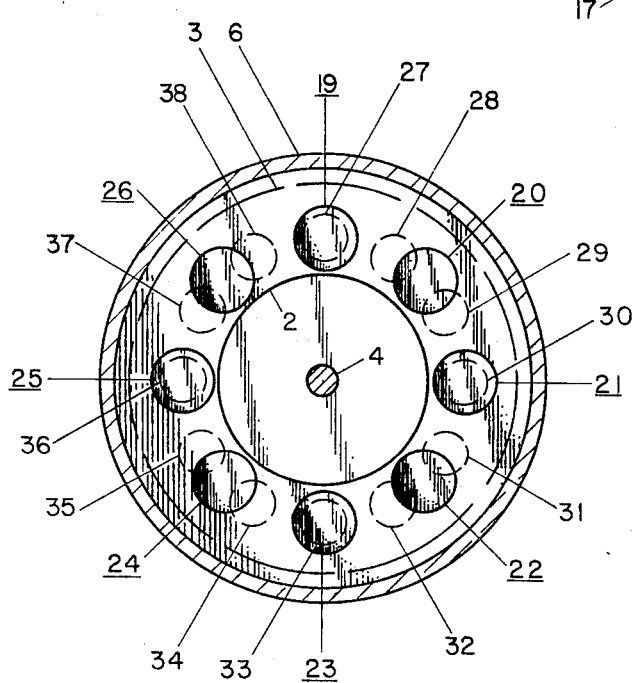
FIG. 4 is Section B—B from FIG. 3 showing the stator.
Figure 5:
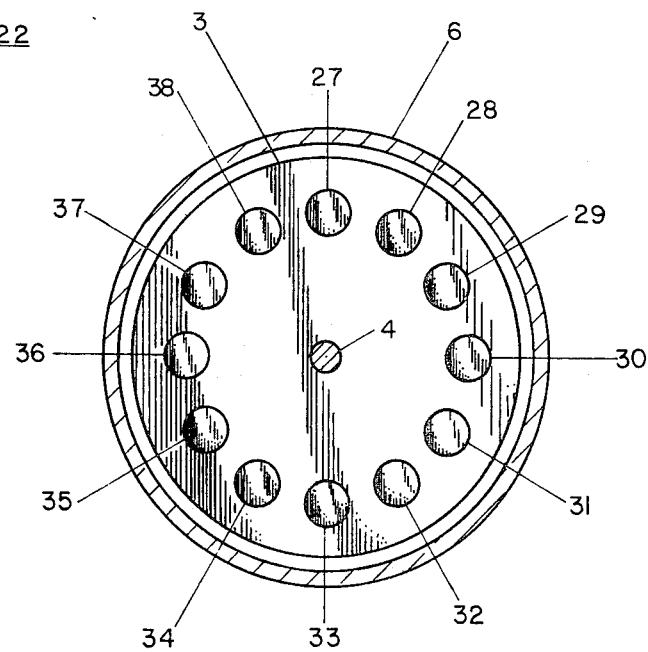
FIG. 5 is Section C—C from FIG. 3 showing an end view of a rotor.

Referring now to FIG. 4, the relative locations of the stator coils 19 through 26 and the rotor magnets 27 through 38 of a motor with twice as many such units are similar to those of the simpler motor, but the radial magnetic gaps are inherently smaller. It will be apparent to those skilled in the art that motors with larger multiples of coils and magnets will present even smaller radial magnetic gaps, even on larger diameter motors. The details of operation of the motors follow.

Referring now to FIG. 6, the advantages of the relative numbers and locations of the coils and magnets become apparent. Coils 19, 21, 23 and 25 on the stator 39 are exactly aligned with permanent magnets 27, 30, 33 and 36 on the rotor 40 and with their primes on the rotor 41. Coils 20, 22, 24 and 26 are simultaneously misaligned relative to permanent magnets 28/29, 31/32, 34/35 and 37/38, and their primes, respectively. The advantage of alternating the polarity of the permanent magnets around each rotor and aligning their polarity from rotor to rotor is now apparent. By proper distribution of current, coils 20 and 24 are given one polarity while coils 22 and 26 are given the opposite polarity, as shown. The other coils are left unmagnetized. As can be readily seen, each magnetic pole of each magnetized coil is now repelling one permanent rotor magnet and attracting a second rotor magnet. It is further apparent, as represented by small arrows between the stator and each rotor, that all of the magnetic forces act in unison to rotate the rotors in the same direction. The magnetic fields are mutually reinforcing each other.

Referring now to FIG. 7, the rotors have rotated 15° so that coils 20, 22, 24 and 26 are now exactly aligned with permanent magnets 28, 31, 34 and 37, and with their primes, respectively. At this point the current distributor turns off all power to said coils 20, 22, 24 and 26.

Meanwhile, coils 19, 21, 23 and 25 have become progressively more misaligned with magnets 38/27, 29/30, 32/33 and 35/36, respectively, and their primes. As the progressive misalignment becomes about half of that shown, coils 19 and 23 are magnetized in the opposite direction as magnets 27 and 33 and their primes, while coils 21 and 25 are magnetized in the opposite direction as coils 19 and 23. This results in rotational forces similar to those described above in explaining FIG. 6.

Referring now to FIG. 8, the rotors have rotated an additional 15° so that there are now rotor magnets in the same locations as other magnets were located in FIG. 6. However, the magnets now have polarities opposite those shown in FIG. 6. Therefore, coils 19, 21, 23 and 25 are again made magnetically neutral at this point; but coils 20, 22, 24 and 26 have been given magnetic polarities opposite what they had in FIG. 6. As described in the explanation of FIG. 7, the magnetic charging of coils 20, 22, 24 and 26 takes place at the point of rotation where the repulsive forces created between their magnetic flux and that of the passing like-poled magnet acquires a significant helpful rotational component.

Referring now to FIG. 9, the rotor has rotated an additional 15° to a point where magnets of opposite polarity are now located where other magnets were in FIG. 7. Again, the distributor neutralizes the same coils as were neutral in FIG. 7, but now charges the other coils with magnetic polarity opposite that which they had in FIG. 7. The timing of the magnetic charging is similar to that previously described, and the resultant rotational forces will also be similar.

It will be apparent to those skilled in the art that when the rotor shave turned 15° beyond the position shown in FIG. 9, the polarities of the magnets will be identical to those shown in FIG. 6 and the sequence of steps shown in FIGS. 6 through 9 will begin again. From this, certain other characteristics of the motor become obvious, among them that each coil is magnetized once in each direction and neutralized twice during each repetition of said sequence. Also, it can be deduced that said sequence will be repeated half as many times per revolution as there are magnets in the rotor (i.e., 12 magnets=6 repetitions/rev., 24 magnets=12 repetitions/rev., etc.).

Other generalizations apparent from the above explanation of FIGS. 6 through 9 also hold for motors with more or less coils. When one-third of the permanent magnets are aligned with one-half of the coils, there are always one-fourth of the coils with positive magnetic polarity and one-fourth of the coils with a negative magnetic polarity. In this position, each positively polarized coil is always radially separated from the next positively polarized coil by one negatively charged coil between two unpolarized coils. There can be arcs between the steps shown in FIGS. 6 through 9 where each coil is polarized, these arcs being between the point where the charging of the upcoming step provides helpful torque and the point where the charging of the previous step ceases to provide helpful torque. When all the coils are magnetically charged, the order of coil charges is positive-positive-negative-negative, repetitively around the stator.

Although the magnets and coils used in the preferred embodiment are cylindrical, other shapes may be used. For example, coils and/or magnets with square or rectangular cross-sections may be used in a motor of this same inventive concept.

Distributor means 5 is provided to properly cycle the magnetizing current from a direct current source to the stator coils. The cycling sequence for the number of poles in the embodiment of FIGS. 6-9 can be seen by reference to the circuit shown in FIG. 10 wherein the poles of a battery or other direct current source are connected to a pair of switches 43, 43' repeatedly cycling together from contacts 44 to 47 and 44' and 47', respectively. Magnetic coils 19, 21, 23 and 25 are in a first bank to be charged simultaneously while the other coils 20, 22, 24 and 26 are in a second bank to be charged as a group alternately with the first bank.

Figure 10:
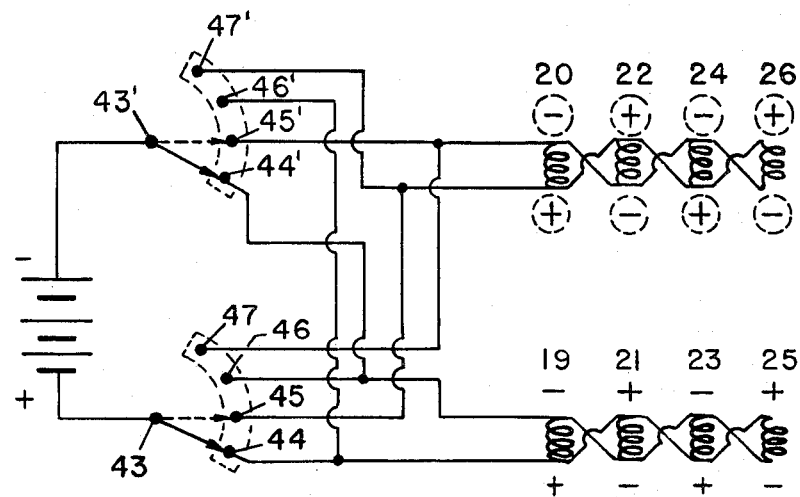
FIG. 10 is a schematic of a distributor circuit for determining the cycling sequence.

When contacts 44, 44' are energized as indicated by the full line position of the switches 43, 43', the magnetic polarity of the coils of the first bank is as shown in FIG. 10 and the second bank is deenergized. This corresponds to FIG. 7. Then when the switches move to contacts 45, 45' as indicated by the broken line position of the switches, the second bank is charged with the polarities as shown in the dotted circles in FIG. 10, and the first bank is deenergized. This corresponds to FIG. 8. Similarily, when the switches progress to contacts 46, 46', the first bank is again activated, but with opposite polarity from that indicated in FIG. 10, and the second bank is deenergized, thereby achieving the condition of FIG. 9. Finally, when the switches move to contacts 47, 47'; the second bank is again charged, but with opposite polarity from that shown in FIG. 10, and the first bank is deenergized, thereby reaching the condition shown in FIG. 6. This cycle is continuously repeated.

Figure 11:
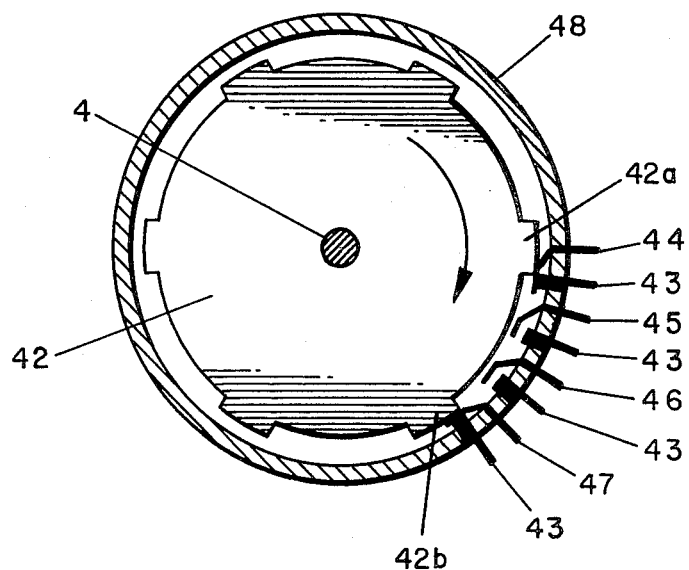
FIG. 11 is a transverse section illustrating one embodiment of distributor means.

Referring to FIG. 11, a mechanical arrangement is illustrated for closing the circuits to the two banks of coils in the manner indicated in FIG. 10. Non-conductive rotor 42 is fixed on shaft 4 in a housing 48 and has a series of six equally spaced cam lobes on its periphery arranged to sequentially engage spring contacts 44-47 and close them against a stationary contact 43 leading to the positive pole of the direct current source. A second cam rotor like rotor 42 is located directly behind it and operates contacts 44'-47' simultaneously to connect them with the negative pole of the direct current source. It is important to note from FIG. 11 that while, for example, contact 44 is being closed by lobe 42a, the previously closed contact 47 engaged by lobe 42b remains closed for an instant so that there will not be a dead spot during the transition from contact 47 to contact 44 in which neither of these contacts is closed. Similarly, when the rotor moves another 15° where lobe 42a is first closing contact 45, contact 44 will not yet have been released by this lobe. The prevention of dead spots as described keeps the shaft 4 from stopping in a position whereat none of the stator coils would be energized when an attempt was made subsequently to start the motor.

Figure 12:
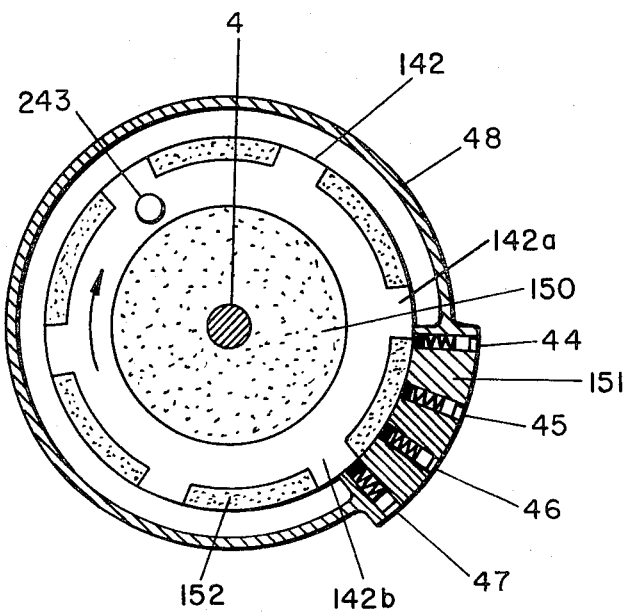
FIG. 12 is a transverse section illustrating a second embodiment of distributor.

A second, more preferred distributor arrangement, involving brushes rather than spring contacts, is shown in FIG. 12. In this example, the cam rotors are replaced by electrically conductive rings 142, 142' separated by an insulating ring 143 and each having an insulating core 150 coupled to the shaft 4. Spring-loaded brush units 44-47, 15° apart from center to center, are mounted in a carrier 151 to move radially inward against the periphery of the ring 142. This ring has circumferential cutouts filled with insulating sections 152 leaving conductive lobes therebetween which extend circumferentially preferably slightly more than 15° so that at least one of the brushes will engage one of the conductive lobes. For example, in FIG. 12 lobe 142a is coming into engagement with brush 44 before lobe 142b leaves brush 47. The other conductive ring 142' is arranged in the same manner with respect to a second set of brushes corresponding to contacts 44'-47' in FIG. 10. Power to the conductive rings 142, 142' may be by way of brushes 243, 243' engaging their outer faces.

Figure 13:
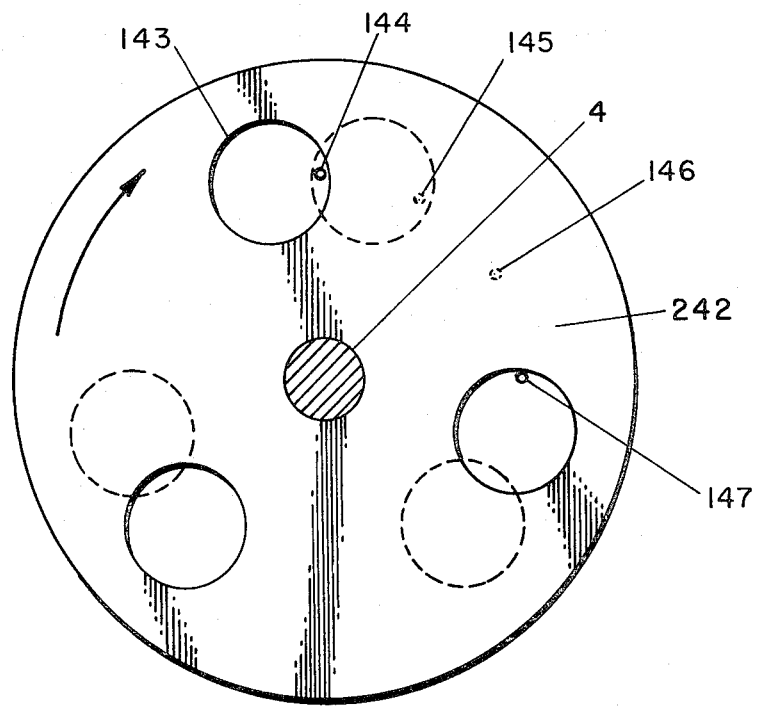
FIG. 13 is a transverse section illustrating a third embodiment of distributor means.

A photoelectric distributor control can also be used and is preferred for many applications. FIG. 13 illustrates such a control for the FIG. 1 embodiment. A disc 242 is mounted on the shaft and has three equally spaced light passage holes 143. Four photoelectric cells are arranged so that their light beams 144-147 are spaced apart 30°, center to center, in an arc centered at the axis of the shaft 4. The holes 143 in the disc 242 have a diameter corresponding to a chord connecting two of the centers of adjoining of the light beams 144-147 and the beams have a width so that there will always be the passage through the disc 242 of at least one of the beams. The amount of overlap in which two of the light beams pass simultaneously through the disc can be varied by varying the size of the light passage holes or by varying the width of the light beams at the disc, as for example, by varying the distance of the light emitters of the photoelectric cells from the disc. The photoelectric cells operate in a suitable circuit to close control switches 44-47 and 44'-47' sequentially as explained with respect to FIG. 10.

It will be appreciated from the foregoing three examples of distributor control systems that in each instance, equally spaced switches, brushes, light cells or other suitable switching means having four elements, or multiples of four elements, can be used, and that their operation is controlled by suitable lobes or light passages, or elements of other sequencing means, in the number of one element per two permanent magnets in each of the permanent magnet rotors. When four elements are present in the switching means, they are preferably spaced apart, center to center, an amount equal to 180° divided by the number of permanent magnets per rotor.

Although described in the foregoing specification in the preferred embodiment, it will be apparent to those skilled in the art that numerous applications of the various novel features of this invention could be conceived which would not change the overall inventive concepts contained therein. For example, although it is preferred to have two rotors for each stator, there may be applications of the invention in which there is only one rotor and one stator. Hence, the scope of this invention is not limited by this specification but is to be construed in accordance with the following claims.

We claim:

1. A magnetic motor comprising:
   drive shaft means defining a central axis;
   a stator ring centered relative to said axis and having 4p (p=any integer) electromagnetic coil means spaced apart equally circumferentially of the ring;
   a rotor coupled to said drive shaft means on one side of the stator ring and having 6p permanent magnets alternating in polarity arrangement and spaced apart equally circumferentially of the rotor such that whenever one of said coil means is aligned with one of said magnets, one-half of the coil means are aligned with one-third of the magnets;
   means for supplying magnetizing current for said coil means; and
   distributor means cycling said current to said coil means in such a manner that (a) each coil means has a like repeating operating cycle in which it is alternately energized and deenergized and has a polarity change each time it is energized, and (b) whenever one-third of the rotor magnets are aligned with one-half of the coil means, such one-half are in a deenergized condition and the remaining one-half of the coil means are in an energized condition with alternating polarities, so that while each coil is energized, it repulses the like magnetic pole of a rotor magnet at the leading side thereof and simultaneously attracts the opposite magnetic pole of the next trailing magnet on the rotor whereby the resulting repulsion and attraction forces contribute additive rotational torques to the rotor, thereby adding torque continuously to said drive shaft means.

2. A magnetic motor according to claim 1 in which said distributor means is operatively connected to said drive shaft means.

3. A magnetic motor comprising:
   drive shaft means defining a central axis;
   a stator ring centered relative to said axis and having 4p (p=any integer) electromagnetic coil means spaced apart equally circumferentially of the ring;
   a pair of rotors coupled to said drive shaft means at opposite sides of the stator ring and each having 6p permanent magnets alternating in polarity arrangement and spaced apart equally circumferentially of the rotor, the polarity of said magnets alternating around said rotor and being aligned in like order from rotor to rotor such that whenever one of said coil means is aligned with one of said magnets, one-half of the coil means are aligned with one-third of the magnets of both rotors;
   means for supplying magnetizing current for said coil means; and
   distributor means cycling said current to said coil means in such a manner that (a) each coil means has a like repeating operating cycle in which it is alternately energized and deenergized and has a polarity change each time it is energized, and (b) whenever one-third of the magnets of each rotor are aligned with one-half of the coil means, such one-half are in a deenergized condition and the remaining one-half of the coil means are in an energized condition with alternating polarities, whereby while each coil means is energized, its poles repulse the like magnetic poles of aligned rotor magnets at the leading side of the coil and simultaneously attract the opposite magnetic poles of the next aligned trailing magnets on the rotors so that the resulting repulsion and attraction forces contribute additive rotational torques to the rotor, thereby adding torque continuously to said drive shaft means.

4. A magnetic motor according to claim 3 in which housing means is connected to said stator ring, and said drive shaft means comprises a shaft connected to said rotors and passing freely through said stator ring and beyond said housing means.

5. A magnetic rotor according to claim 4 in which said distributor means is operatively connected to said drive shaft means within said housing means.

6. A magnetic motor according to claim 3 in which each coil means is arranged so that when charged, its poles are located at opposite sides of the stator ring and equidistant from said axis.

7. A magnetic motor according to claim 6 in which each rotor magnet has its poles located at opposite sides of the respective rotor and equidistant from said axis.

8. A magnetic motor comprising:
drive shaft means defining a central axis;
a plurality of stator rings centered relative to said axis and having 4p (p=any integer) electromagnetic coil means spaced apart equally circumferentially of the rings;
a plurality of rotors coupled to said drive shaft means and arranged so that each stator has rotors at opposite sides thereof and there is only one stator ring between adjoining rotors, each rotor having 6p permanent magnets spaced apart equally circumferentially of the rotor, the polarity of said magnets alternating around said rotors and being aligned in like order from rotor to rotor such that whenever one of said coil means of a stator ring is aligned with one of said magnets of the adjoining rotors, one-half of the coil means of all of the stator rings are aligned with one-third of the magnets of all of the rotors;
means for supplying magnetizing current for said coil means; and
distributor means cycling said current to said coil means in such a manner that (a) each coil means has a like repeating operating cycle in which it is alternately energized and deenergized and has a polarity change each time it is energized, and (b) whenever one-third of the magnets of each rotor are aligned with one-half of the coil means of each stator ring, such one-half are in a deenergized condition and the remaining one-half of the coil means of each stator ring are in an energized condition with alternating polarities, whereby while each coil means is energized, it repulses the like magnetic poles of aligned rotor magnets on the adjoining rotors at the leading side of the coil means and simultaneously attracts the opposite magnetic poles of the next aligned trailing magnets on the adjoining rotors whereby the resulting repulsion and attraction forces contribute additive rotational torques to the rotor, thereby adding torque continuously to said drive shaft means.

* * * * *